(12) United States Patent
Blasi et al.

(10) Patent No.: US 12,432,354 B2
(45) Date of Patent: Sep. 30, 2025

(54) VIDEO ENCODING AND VIDEO DECODING

(71) Applicant: British Broadcasting Corporation, London (GB)

(72) Inventors: Saverio Blasi, London (GB); Andre Seixas Dias, London (GB); Gosala Kulupana, London (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 18/237,686

(22) Filed: Aug. 24, 2023

(65) Prior Publication Data

US 2023/0412818 A1    Dec. 21, 2023

Related U.S. Application Data (63) Continuation of application No. 17/418,101, filed as application No. PCT/GB2019/053124 on Nov. 5, 2019, now Pat. No. 11,778,201.

(30) Foreign Application Priority Data

Dec. 28, 2018   (GB) ...................................... 1821283

(51) Int. Cl.
   *H04N 19/159*   (2014.01)
   *H04N 19/105*   (2014.01)
   *H04N 19/17*    (2014.01)

(52) U.S. Cl.
   CPC ......... *H04N 19/159* (2014.11); *H04N 19/105* (2014.11); *H04N 19/17* (2014.11)

(58) Field of Classification Search
   CPC ........................... H04N 19/159; H04N 19/105
   See application file for complete search history.

(56) References Cited

U.S. PATENT DOCUMENTS

| | | | | |
|---|---|---|---|---|
| 10,904,522 | B2* | 1/2021 | Lim | H04N 19/119 |
| 11,509,908 | B2* | 11/2022 | Drugeon | H04N 19/176 |
| 2013/0343648 | A1 | 12/2013 | Sato | |
| 2017/0280144 | A1* | 9/2017 | Dvir | H04N 19/119 |
| 2018/0302631 | A1* | 10/2018 | Chiang | H04N 19/176 |
| 2019/0356915 | A1* | 11/2019 | Jang | H04N 19/176 |
| 2020/0154101 | A1* | 5/2020 | Li | H04N 19/46 |
| 2021/0058636 | A1* | 2/2021 | Abe | H04N 19/159 |

(Continued)

FOREIGN PATENT DOCUMENTS

| | | |
|---|---|---|
| EP | 4009632 | 6/2022 |
| EP | 4017000 | 6/2022 |

(Continued)

OTHER PUBLICATIONS

Blaser et al., Description of SRD and 360 video coding technology proposal, Apr. 2018, JVET, pp. 1-85 (Year: 2018).*

(Continued)

*Primary Examiner* — Irfan Habib
(74) *Attorney, Agent, or Firm* — Klintworth & Rozenblat LLP (57) ABSTRACT

Decoding of a merge-predicted block is carried out, for triangular partitions of the block, using a combination of inter-prediction and intra-prediction. The combination of inter-prediction and intra-prediction to be used is signalled on a received bitstream. Combination may be algorithmic, for example arithmetic.

13 Claims, 7 Drawing Sheets

(56) References Cited

U.S. PATENT DOCUMENTS

| | | | |
|---|---|---|---|
| 2021/0120235 A1* | 4/2021 | Liao | H04N 19/105 |
| 2021/0250598 A1* | 8/2021 | Nishi | H04N 19/119 |
| 2022/0070448 A1* | 3/2022 | Kim | H04N 19/109 |
| 2022/0070463 A1* | 3/2022 | Lee | H04N 19/54 |
| 2022/0070475 A1* | 3/2022 | Lee | H04N 19/105 |
| 2022/0109876 A1 | 4/2022 | Zhang et al. | |
| 2022/0174299 A1 | 6/2022 | Zhang et al. | |
| 2022/0312012 A1 | 9/2022 | Koo et al. | |

FOREIGN PATENT DOCUMENTS

| | | |
|---|---|---|
| JP | 6998888 | 1/2022 |
| RU | 2584498 | 5/2013 |
| RU | 2014147451 | 6/2016 |
| WO | 2018132710 | 7/2018 |
| WO | 2018236031 | 12/2018 |
| WO | WO2019029560 A1 | 2/2019 |
| WO | 2018174402 | 6/2020 |

OTHER PUBLICATIONS

Sharabayko et al., Effectiveness of Internal Block Prediction Methods, Proceedings of Tomsk Polytechnic University, 2013. T. 322. No. 5, with machine translation (14 pages).

Bezrukov and Balobanov, "Digital Broadcasting and Applied Television Systems," Moscow Hot Line—Telecom 2016 (pp. 478, with machine translation (10 pages).

Chen et al, "Joint inter-intra prediction based on mode-variant and edge-directed weighting approaches in video coding", 2014 IEEE International Conference on Acoustic, Speech and Signal Processing (ICASSP), pp. 7372-7376.

Hagai et al, "Proposal of Intra Prediction for Improved Macroblock Prediction Modes (VPM2)" Joint Video Team (JVT) 2nd Meeting: Geneva, CH, Jan. 29-Feb. 1, 2002, 8 pages.

* cited by examiner

VIDEO ENCODING AND VIDEO DECODING

CROSS REFERENCE TO RELATED APPLICATIONS

The present application is a continuation of Blasi et al., U.S. patent application Ser. No. 17/418,101, entitled "Video Encoding and Video Decoding" and filed Jun. 24, 2021, which is a U.S. National Phase Entry of Blasi et al., International Application No. PCT/GB2019/053124, entitled "Video Encoding and Video Decoding" and filed Nov. 5, 2019, which in turn is a continuation of Blasi et al., United Kingdom Patent Application No. GB1821283.7, entitled "Video Encoding and Video Decoding" and filed Dec. 28, 2018. The entire contents of all of these applications are incorporated herein by reference.

FIELD

This disclosure relates to video encoding and video decoding.

BACKGROUND

Video compression provides opportunities to reduce payload on a transmission channel. Known video coding standards enable transmission of bitstream data defining a video, such that a receiver of the bitstream is able to decode the bitstream in such a way as to construct a decoded video which is substantially faithful to the original video from which the encoded bitstream was derived.

Early video coding standards were devised with a view to reproduction of video on equipment where relatively low or medium quality reconstruction is acceptable. This includes hand-held devices or personal computing devices. To a large extent, the acceptability of particular levels of quality is as much driven by user demand as by the capability of the playback equipment.

As receiver equipment improves in quality and capability, so does user demand for higher quality reproduction of original video. The technical objective thus emerges to enable reproduction of video on a player, to a higher quality than hitherto implemented.

DESCRIPTION OF EMBODIMENTS

Aspects of the present disclosure may correspond with the subject matter of the appended claims.

In general terms, in certain embodiments disclosed herein, decoding of a merge-predicted block is carried out, for triangular partitions of the block, using a combination of inter-prediction and intra-prediction. The combination of inter-prediction and intra-prediction to be used is signalled on a received bitstream. Combination may be algorithmic, for example arithmetic.

Embodiments disclosed herein relate to a method of performing prediction in a video codec by means of more efficiently partitioning and exploiting redundancies. As will be appreciated by the reader, a video presentation generally comprises a plurality of frames, for sequential display on playback equipment. Various strategies are used to reduce the amount of data required to describe each frame in turn on a bitstream transmitted on a communications channel from an emitter to a receiver. As will be understood, the emitter will comprise an encoder for encoding the frame data into a bitstream, and the receiver will comprise a decoder for generating frame data on the basis of information borne in the bitstream.

In embodiments of the present disclosure, each frame of the video presentation is partitioned into blocks. At the encoder, the content of a block is predicted based on previously compressed content. This block prediction is subtracted from the actual block, resulting in a set of residual differences (residuals). In an embodiment, the residual data can be encoded using a transformation into the frequency domain. However, as will be recognised by the reader, the transform of data from the time domain to the frequency domain may be specific to certain implementations, and is not essential to the performance of disclosed embodiments.

An approach to video encoding and decoding allows blocks to be partitioned following a so-called "triangular" partitioning. This consists of splitting a block into two portions along a diagonal. The two resulting triangular partitions can be predicted using merge prediction, where different merge candidates are used to predict each triangular partition.

Merge prediction may be employed to compute the inter-prediction for a given set of samples, in which the content of a partition can be predicted on the basis of the motion information pertaining to another neighbouring block or neighbouring block partition.

In certain circumstances, inter-prediction may not provide a good prediction for a specific triangular partition. Thus, embodiments described herein provide an encoding process, and a corresponding decoding process, in which other types of prediction, such as intra-prediction, may be employed on triangular partitions, with a prospect of leading to more accurate results.

In an embodiment, two predictions are computed, one for each triangular partition in the block. Each prediction respectively is formed as a combination of an inter-prediction (for instance computed by means of merge prediction) and an intra-prediction (computed by means of a mode that is either inferred, or signalled in the bitstream).

In an embodiment, one or both of the triangular partitions are predicted using a combination of inter-prediction and intra-prediction, wherein the combination takes place by means of a weighted average, where the weights are either inferred, or signalled in the bitstream.

Embodiments may accommodate a case wherein the weight associated with the inter-prediction is 0 and the weight associated with intra-prediction is 1; in such a case, then one or both of the two triangular partitions will be predicted completely using intra-prediction.

Similarly, embodiments may accommodate a case wherein the weight associated with the inter-prediction is 1 and the weight associated with intra-prediction is 0; in such a case, then one of the two triangular partitions will be predicted completely using inter-prediction.

By way of background, work on the establishment of a video compression standard under the heading "VVC" has been commissioned by JVET, formed by MPEG and VCEG. An approach to triangular prediction currently adopted in the draft VVC specifications will now be described.

A list of 40 possible triangular candidates is considered. This list is composed of all possible combinations of:
1. 5 possible merge candidates;
2. 2 different "splits", corresponding to splitting the block along each of the two diagonals.

In this process, each triangular partition must use different merge candidates. Thus, a total of 5×5−5=20 possible merge candidate pairs are available. Considering that a block may be split along either diagonal, this brings the total number of triangular candidates to 40.

The edge between the two triangular predictions is smoothed by means of a smoothing filter.

Signalling happens by means of a mechanism whereby the total 40 candidates are sorted in a predefined look-up table. Then, in one approach to signalling, a bit is signalled to determine whether the candidate is one of the first two candidates in the list; if that is the case, then an additional bit is signalled to identify whether the candidate is the first or the second in the list. If the candidate is not one of the first two candidates in the list, then a further approach to data compression is used. One option is to use a form of exponential Golomb coding to signal the position of the current element among the remaining 38 elements in the look-up table.

The reader will appreciate that embodiments disclosed herein are not limited in their application to the above approach—different techniques for partitioning, for assembling a list of triangular candidates, for signalling, and for encoding data for signalling, may be employed and the present disclosure is not mandated on any one implementation.

Embodiments disclosed herein make use of a combination of intra and inter-prediction to compute each of the two triangular partitions of a block. The resulting weighted intra and inter-predictions are then treated in the same way as conventional VVC triangular predictions, which means they may be smoothed at the edge forming the boundary between the two triangular partitions of the block.

As noted above, a look-up table may be established, to enable signalling by an encoder and, correspondingly, interpretation of information signalled on a bitstream received by a decoder, to identify which of the possible triangular candidates has been employed in an encoding.

In one embodiment, the hitherto described look-up table may be extended to include additional candidates, corresponding to performing intra-prediction to predict one of the triangular partitions. For instance, 8 additional candidates can be included in the list of possible triangular combinations, to account for using an intra-prediction candidate to predict one of the two triangular partitions. Indexes can be used to identify that intra-prediction is used to predict one of the triangular partitions, where an index is used for each different intra-prediction mode, where these indexes are different from the existing indexes used to identify the various merge candidates used for inter-prediction.

The additional 8 candidates may correspond for instance to using:
1. Planar prediction to intra-predict one triangular partition and merge candidate 0 or merge candidate 1 to inter-predict the other triangular partition. A total of 4 possible options are available. Considering the two different "splits", this brings the total of additional candidates to 8.
2. Planar prediction or DC prediction to intra-predict one triangular partition and merge candidate 0 to inter-predict the other triangular partition. Again, a total of 4 possible options are available. Considering the two different "splits", this brings the total of additional candidates to 8.

The reader will appreciate that further candidates, in addition to the 8 proposed above, may be added to the list to represent different options formed of predicting one triangular partition with an intra-prediction mode and the other triangular partition with an inter-prediction.

In another embodiment, the process used to compute a list of Most Probable Modes (MPM) used to encode and decode the intra-prediction mode in intra-predicted blocks may be used to signal the intra-prediction mode to use in each of the triangular partitions. For instance, each element in the look-up table may refer to a specific position in the MPM list, which refers to a specific intra-prediction mode.

In another embodiment, the look-up table may be extended to include additional candidates, corresponding to performing a combination of intra-prediction and inter-prediction to predict one of the triangular partitions. An intra-prediction and an inter-prediction are computed for one, or both of the two triangular partitions. If only one triangular partition is predicted using a combination of intra-prediction and inter-prediction, the other triangular partition is predicted using conventional merge inter-prediction or conventional intra-prediction. The combination of intra-prediction and inter-prediction may happen for instance by means of weighted average.

For instance, 8 additional candidates can be included in the list of possible triangular combinations. Indexes are used to identify that the combination of intra-prediction and inter-prediction is needed, where an index is used to identify a given combination of a specific intra-prediction mode, a given weight, and a specific merge candidate inter-prediction, where these indexes are different than the existing indexes used to identify the merge candidates used for conventional inter-prediction. The additional 8 candidates may correspond, for instance, to using planar prediction in combination with merge candidate 0 to predict one triangular partition and merge candidate 0 to inter-predict the other triangular partition, where two pairs of weightings are used to perform the combination of the inter-prediction and intra-prediction, for instance an equal weighting pair of (0.5, 0.5), and an asymmetric weighting pair of (0.75, 0.25). A total of 4 possible options are available. Considering the two different "splits", this brings the total number of additional candidates to 8.

More than 8 candidates may be added to the list to represent different options comprising predicting at least one triangular partition by means of a combination of an intra-prediction mode and an inter-prediction; the other triangular partition of the same block may be predicted by way of an inter-prediction.

In another embodiment, an additional flag is signalled on the bitstream for each of the two triangular partitions, to signal whether a combination of intra-prediction and inter-prediction is used instead of conventional inter-prediction. Additional signalling may be signalled to determine usage of different intra-prediction modes. For instance, if a mechanism to compute MPM for signalling of the intra-prediction mode is implemented, then signalling may indicate that MPM should be deployed to determine the appropriate intra-prediction mode to use. Similarly, a pre-defined list of intra-prediction modes may be implemented, and signalling may be employed to determine how an intra-prediction mode should be selected from the pre-defined list. Additional signalling may further be signalled to determine usage of different weightings to perform the combination of intra-prediction and inter-prediction.

An embodiment described herein employs a fixed set of weights. The weights are available in look-up tables, where different weights may be used for blocks with different characteristics, such as block size or depending on other available information. The look-up tables may be provided in advance to suitably configured encoders and decoders. Alternatively, the look up tables could be transmitted from an encoder to a decoder, either as a part of the transmission of the encoded video, or as a prior configuration transmission.

An index to extract the correct element from the look-up table is then decoded from the bitstream so that the correct set of weights can be selected and used when performing the prediction.

In another embodiment, rather than communicating an index to a LUT entry, the weight or weights can be directly extracted from the bitstream.

Figure 1:
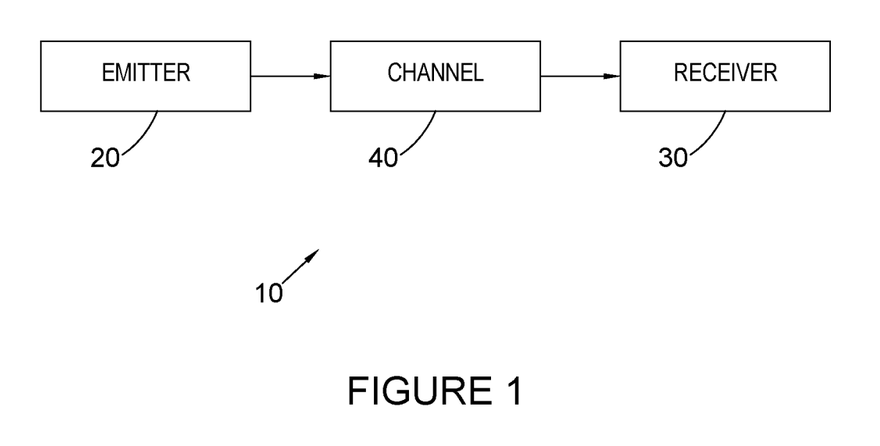
FIG. 1 is a schematic representation of a communications network in accordance with an embodiment.

As illustrated in FIG. 1, an arrangement is illustrated comprising a schematic video communication network 10, in which an emitter 20 and a receiver 30 are in communication via a communications channel 40. In practice, the communications channel 40 may comprise a satellite communications channel, a cable network, a ground-based radio broadcast network, a POTS-implemented communications channel, such as used for provision of internet services to domestic and small business premises, fibre optic communications systems, or a combination of any of the above and any other conceivable communications medium.

Furthermore, the disclosure also extends to communication, by physical transfer, of a storage medium on which is stored a machine readable record of an encoded bitstream, for passage to a suitably configured receiver capable of reading the medium and obtaining the bitstream therefrom. An example of this is the provision of a digital versatile disk (DVD) or equivalent. The following description focuses on signal transmission, such as by electronic or electromagnetic signal carrier, but should not be read as excluding the aforementioned approach involving storage media.

Figure 2:
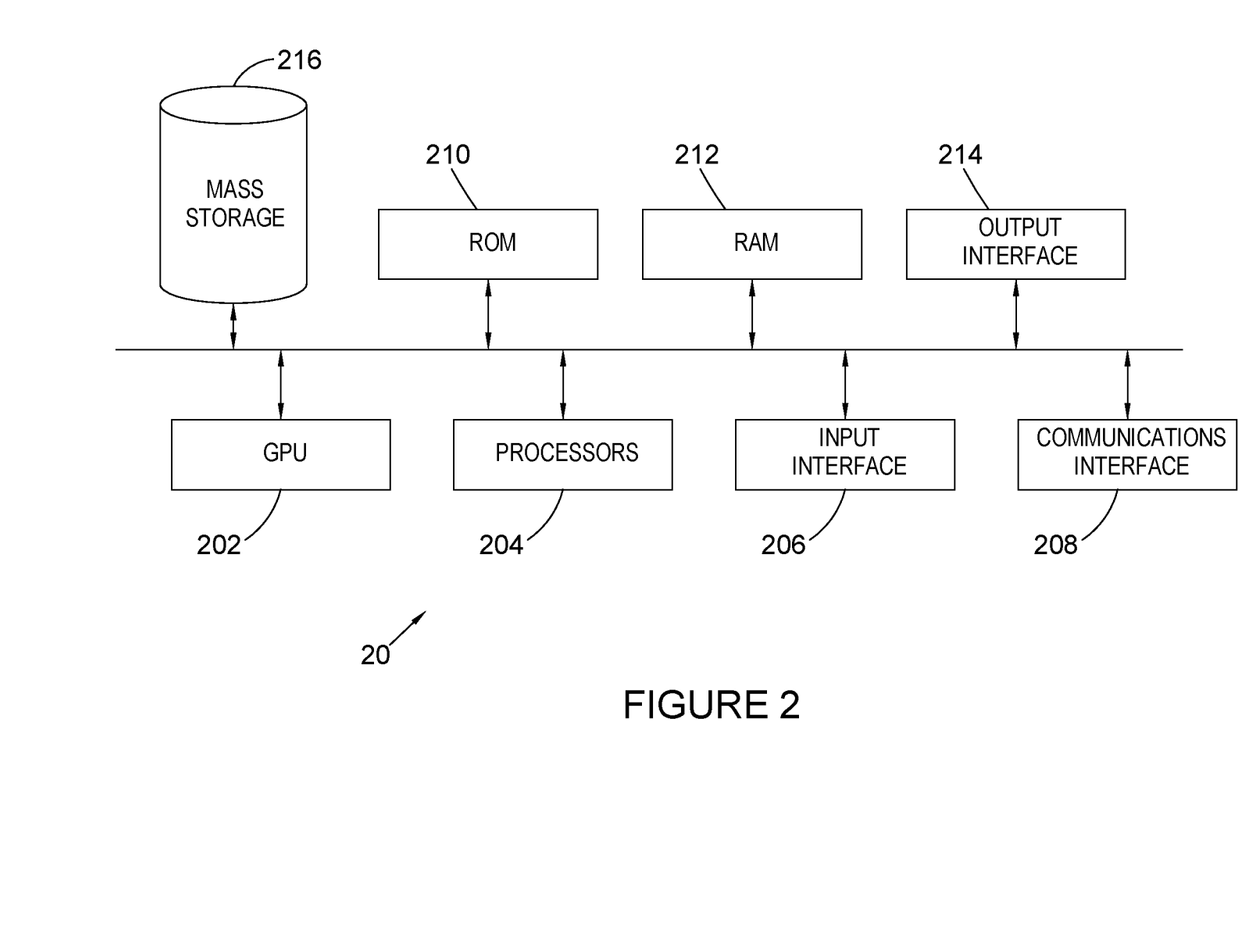
FIG. 2 is a schematic representation of an emitter of the communications network of FIG. 1.

As shown in FIG. 2, the emitter 20 is a computer apparatus, in structure and function. It may share, with general purpose computer apparatus, certain features, but some features may be implementation specific, given the specialised function for which the emitter 20 is to be put. The reader will understand which features can be of general purpose type, and which may be required to be configured specifically for use in a video emitter.

The emitter 20 thus comprises a graphics processing unit 202 configured for specific use in processing graphics and similar operations. The emitter 20 also comprises one or more other processors 204, either generally provisioned, or configured for other purposes such as mathematical operations, audio processing, managing a communications channel, and so on.

An input interface 206 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 214 is operable to provide a facility for output of signals to a user or another device. Such output could include a display signal for driving a local video display unit (VDU) or any other device.

A communications interface 208 implements a communications channel, whether broadcast or end-to-end, with one or more recipients of signals. In the context of the present embodiment, the communications interface is configured to cause emission of a signal bearing a bitstream defining a video signal, encoded by the emitter 20. The processors 204, and specifically for the benefit of the present disclosure, the GPU 202, are operable to execute computer programs, in operation of the encoder. In doing this, recourse is made to data storage facilities provided by a mass storage device 208 which is implemented to provide large-scale data storage albeit on a relatively slow access basis, and will store, in practice, computer programs and, in the current context, video presentation data, in preparation for execution of an encoding process.

A Read Only Memory (ROM) 210 is preconfigured with executable programs designed to provide the core of the functionality of the emitter 20, and a Random Access Memory 212 is provided for rapid access and storage of data and program instructions in the pursuit of execution of a computer program.

Figure 3:
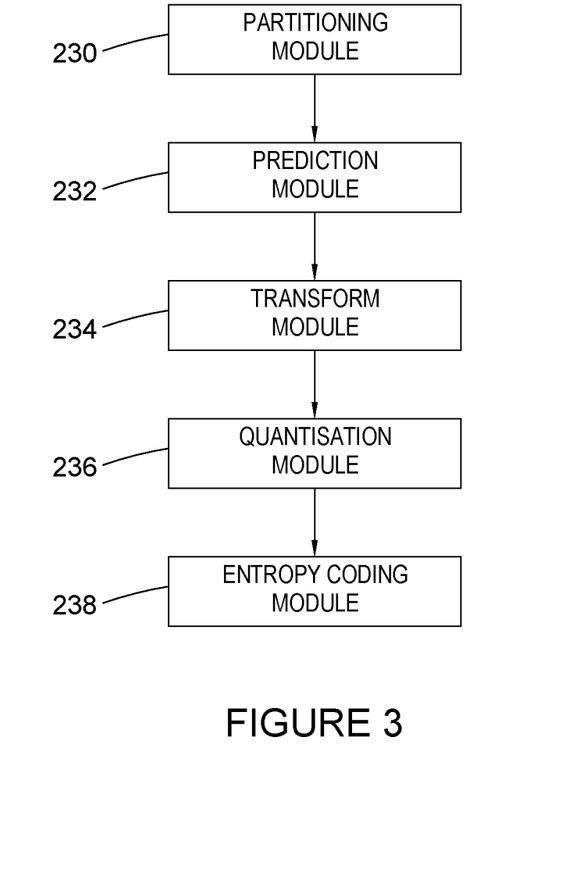
FIG. 3 is a diagram illustrating an encoder implemented on the emitter of FIG. 2.

The function of the emitter 20 will now be described, with reference to FIG. 3. FIG. 3 shows a processing pipeline performed by an encoder implemented on the emitter 20 by means of executable instructions, on a datafile representing a video presentation comprising a plurality of frames for sequential display as a sequence of pictures.

The datafile may also comprise audio playback information, to accompany the video presentation, and further supplementary information such as electronic programme guide information, subtitling, or metadata to enable cataloguing of the presentation. The processing of these aspects of the datafile are not relevant to the present disclosure.

Referring to FIG. 3, the current picture or frame in a sequence of pictures is passed to a partitioning module 230 where it is partitioned into rectangular blocks of a given size for processing by the encoder. This processing may be sequential or parallel. The approach may depend on the processing capabilities of the specific implementation.

Each block is then input to a prediction module 232, which seeks to discard temporal and spatial redundancies present in the sequence and obtain a prediction signal using previously coded content. Information enabling computation of such a prediction is encoded in the bitstream. This information should comprise sufficient information to enable computation, including the possibility of inference at the receiver of other information necessary to complete the prediction.

The prediction signal is subtracted from the original signal to obtain a residual signal. This is then input to a transform module 234, which attempts to further reduce spatial redundancies within a block by using a more suitable representation of the data. The reader will note that, in some embodiments, domain transformation may be an optional stage and may be dispensed with entirely. Employment of domain transformation, or otherwise, may be signalled in the bitstream.

The resulting signal is then typically quantised by quantisation module 236, and finally the resulting data formed of the coefficients and the information necessary to compute the prediction for the current block is input to an entropy coding module 238 makes use of statistical redundancy to represent the signal in a compact form by means of short binary codes. Again, the reader will note that entropy coding may, in some embodiments, be an optional feature and may be dispensed with altogether in certain cases. The employment of entropy coding may be signalled in the bitstream, together with information to enable decoding, such as an index to a mode of entropy coding (for example, Huffman coding) and/or a code book.

By repeated action of the encoding facility of the emitter 20, a bitstream of block information elements can be constructed for transmission to a receiver or a plurality of receivers, as the case may be. The bitstream may also bear information elements which apply across a plurality of block information elements and are thus held in bitstream syntax independent of block information elements. Examples of such information elements include configuration options, parameters applicable to a sequence of frames, and parameters relating to the video presentation as a whole.

The prediction module 232 will now be described in further detail, with reference to FIG. 4. As will be understood, this is but an example, and other approaches, within the scope of the present disclosure and the appended claims, could be contemplated.

The following process is performed on each motion compensated block in an inter-predicted frame.

The prediction module 232 is configured to determine, for a given block partitioned from a frame, whether it is advantageous to apply triangular partitioning to the block, and, if so, to generate triangular partitions for the block and partitioning information to enable signalling to a decoder as to the manner in which the block has been subjected to triangular partitioning and how the triangular partitions are then to be decoded. The prediction module then applies the selected mode of triangular partitioning, if applicable, and then determines a prediction, on the basis of which residuals can then be generated as previously noted. The prediction employed is signalled in the bitstream, for receipt and interpretation by a suitably configured decoder. In case the encoder determines that it is not advantageous to apply triangular partitioning to the block, conventional prediction methods may be employed to predict the content of the block, including conventional inter-prediction and/or conventional intra-prediction techniques. The encoder will signal, by means of a flag, on the bitstream, whether or not triangular partitioning has been employed.

Figure 4:
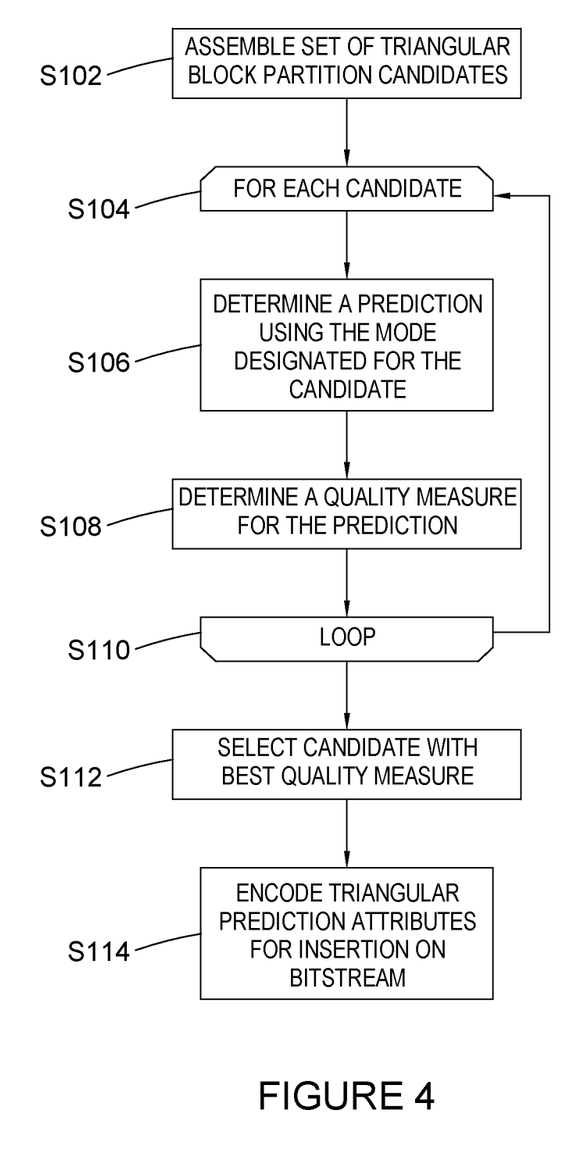
FIG. 4 is a flow diagram of a prediction process performed at a prediction module of the encoder of FIG. 3.

Turning therefore to the encoder-side algorithm illustrated in FIG. 4, in step S102 a set of candidate triangular partitions is assembled for the block in question. Candidates are assembled using the possible combinations of merge candidates and diagonal splits, as previously described. This will include the 40 candidates obtained from the various merge prediction options across the two diagonal splits, plus the extension to the candidates involving intra-prediction as described above. Thus, this enables the possibility of selection of candidates involving a combination of inter-prediction and intra-prediction, as discussed previously. As another example, the LUT may include 40 candidates obtained from 5 MPM intra-prediction mode options across the two diagonal splits. This enables the possibility of selection of candidates involving performing intra-prediction on each triangular partition, as discussed previously.

Then a loop commences in step S104, with operations carried out on each candidate triangular partition. For each triangular partition candidate, in step S106, a prediction is determined using the mode associated with that candidate. In step S108, a quality measure is determined for that prediction, comprising a score of accuracy of the prediction with respect to the original data. Step S110 signifies the closure of the loop.

Thus, when all candidates have been considered, in step S112, the candidate with the best quality score is selected. The attributes of this candidate are then encoded, such as using an encoding established in a look-up table or using a Golomb code as described above. These attributes are added to the bitstream for transmission.

Figure 5:
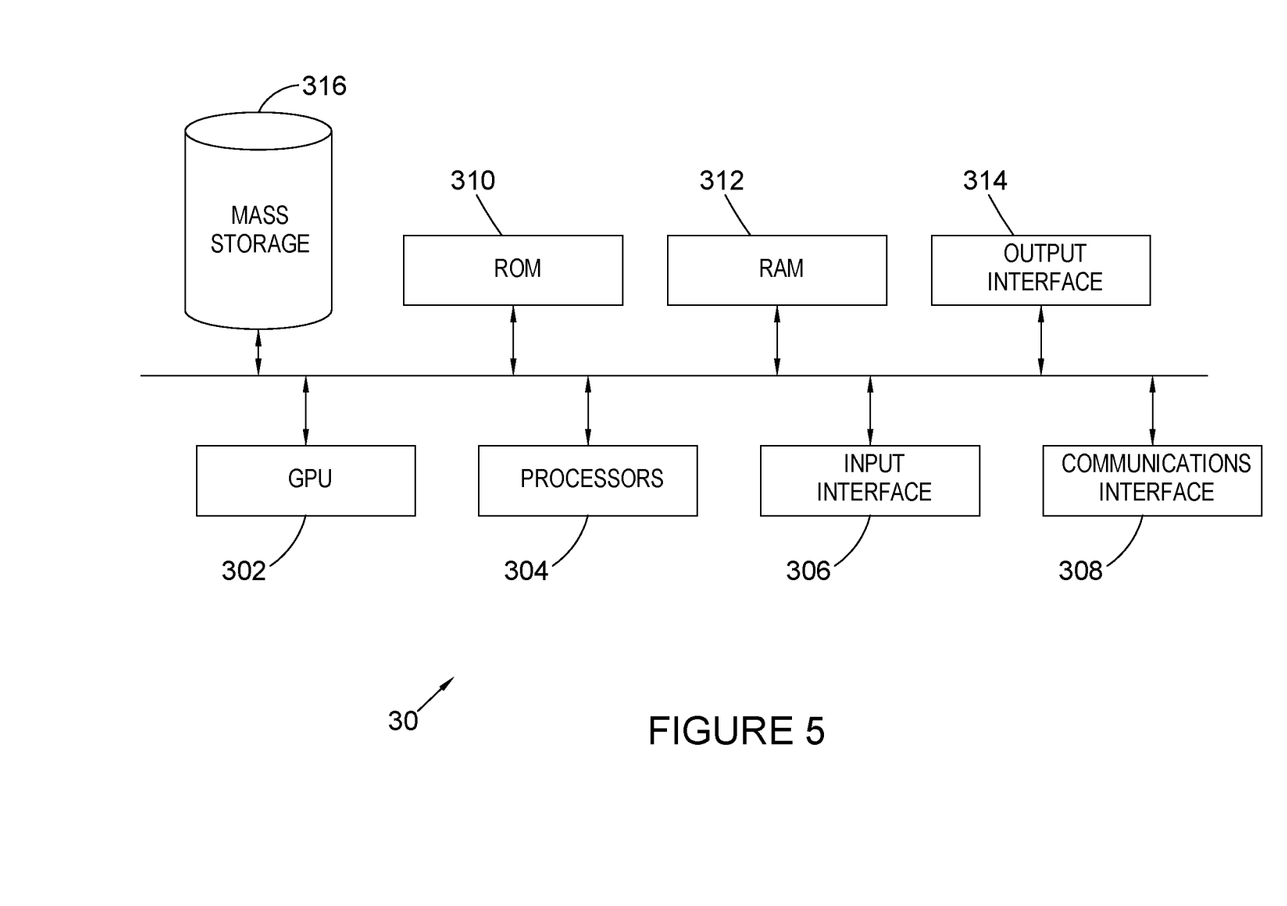
FIG. 5 is a schematic representation of a receiver of the communications network of FIG. 1.

The structural architecture of the receiver is illustrated in FIG. 5. It has the elements of being a computer implemented apparatus. The receiver 30 thus comprises a graphics processing unit 302 configured for specific use in processing graphics and similar operations. The receiver 30 also comprises one or more other processors 304, either generally provisioned, or configured for other purposes such as mathematical operations, audio processing, managing a communications channel, and so on.

As the reader will recognise, the receiver 30 may be implemented in the form of a set-top box, a hand held personal electronic device, a personal computer, or any other device suitable for the playback of video presentations.

An input interface 306 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 314 is operable to provide a facility for output of signals to a user or another device. Such output could include a television signal, in suitable format, for driving a local television device.

A communications interface 308 implements a communications channel, whether broadcast or end-to-end, with one or more recipients of signals. In the context of the present embodiment, the communications interface is configured to cause emission of a signal bearing a bitstream defining a video signal, encoded by the receiver 30.

The processors 304, and specifically for the benefit of the present disclosure, the GPU 302, are operable to execute computer programs, in operation of the receiver. In doing this, recourse is made to data storage facilities provided by a mass storage device 308 which is implemented to provide large-scale data storage albeit on a relatively slow access basis, and will store, in practice, computer programs and, in the current context, video presentation data, resulting from execution of an receiving process.

A Read Only Memory (ROM) 310 is preconfigured with executable programs designed to provide the core of the functionality of the receiver 30, and a Random Access Memory 312 is provided for rapid access and storage of data and program instructions in the pursuit of execution of a computer program.

Figure 6:
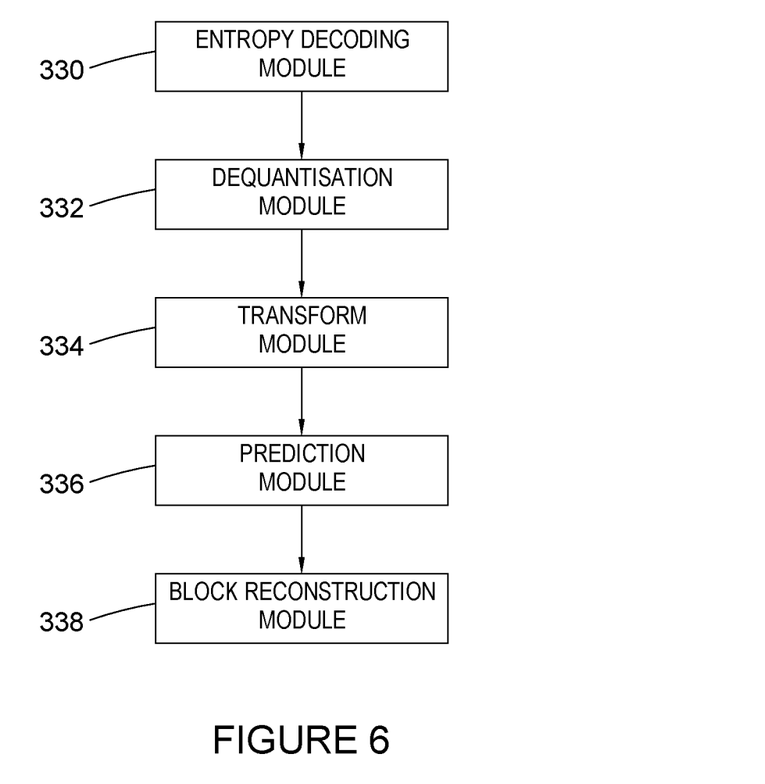
FIG. 6 is a diagram illustrating a decoder implemented on the receiver of FIG. 4.

The function of the receiver 30 will now be described, with reference to FIG. 6. FIG. 6 shows a processing pipeline performed by a decoder implemented on the receiver 20 by means of executable instructions, on a bitstream received at the receiver 30 comprising structured information from which a video presentation can be derived, comprising a reconstruction of the frames encoded by the encoder functionality of the emitter 20.

The decoding process illustrated in FIG. 6 aims to reverse the process performed at the encoder. The reader will appreciate that this does not imply that the decoding process is an exact inverse of the encoding process.

A received bit stream comprises a succession of encoded information elements, each element being related to a block. A block information element is decoded in an entropy decoding module 330 to obtain a block of coefficients and the information necessary to compute the prediction for the current block. The block of coefficients is typically dequantised in dequantisation module 332 and typically inverse transformed to the spatial domain by transform module 334.

As noted above, the reader will recognise that entropy decoding, dequantisation and inverse transformation would only need to be employed at the receiver if entropy encoding, quantisation and transformation, respectively, had been employed at the emitter.

A prediction signal is generated as before, from previously decoded samples from current or previous frames and using the information decoded from the bit stream, by prediction module 336. A reconstruction of the original picture block is then derived from the decoded residual signal and the calculated prediction block in the reconstruction block 338. The prediction module 336 is responsive to information, on the bitstream, signalling the use of triangular partitioning and, if such information is present, reading from the bitstream the mode under which triangular partitioning has been implemented and thus which prediction technique should be employed in reconstruction of a block information sample.

By repeated action of the decoding functionality on successively received block information elements, picture blocks can be reconstructed into frames which can then be assembled to produce a video presentation for playback.

An exemplary decoder algorithm, complementing the encoder algorithm described earlier, is illustrated in FIG. 7.

Figure 7:
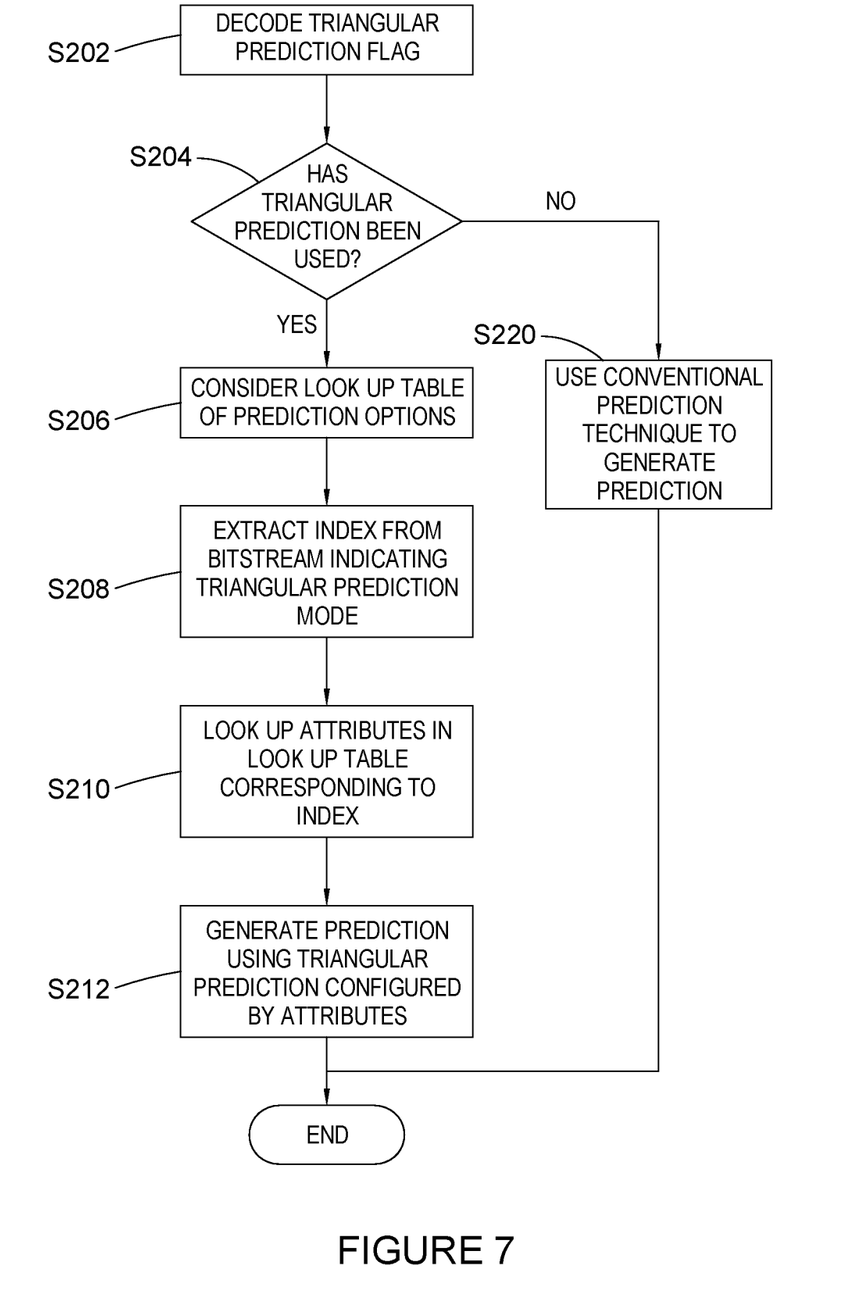
FIG. 7 is a flow diagram of a prediction process performed at a prediction module of the decoder of FIG. 6.

As noted previously, the decoder functionality of the receiver 30 extracts from the bitstream a succession of block information elements, as encoded by the encoder facility of the emitter 20, defining block information and accompanying configuration information.

In general terms, the decoder avails itself of information from prior predictions, in constructing a prediction for a present block. In doing so, the decoder may combine the knowledge from inter-prediction, i.e. from a prior frame, and intra-prediction, i.e. from another block in the same frame.

Thus, for a merge-predicted block, in step S202, the information enabling formation of a prediction candidate is extracted from the bitstream. This can be in the form of a flag, which may be binary in syntactical form, indicating whether or not triangular prediction has been used.

In step S204, a decision is taken dependent on the value of this flag. If triangular prediction is to be used for the merge-predicted block, then in step S206 a look-up table containing a list of possible triangular prediction options is considered. This list may be pre-determined, or may depend on information inferred from available information (such as the size of the block). It may be pre-stored at the receiver, or it may be transmitted thereto on the bitstream. This prior transmission may be at a commencement transmission of the current bitstream transmission, or it may be, for instance, in a pre-configuration transmission to the receiver to configure the receiver to be capable of decoding bitstreams encoded to a particular specification.

In step S208, an index is extracted from the bitstream to signal which item in the look-up table is to be employed in generating a prediction. In step S210, the look-up table is consulted, in accordance with the index, to obtain a set of attributes defining the triangular prediction mode to be used. The attributes may be considered, collectively, as prediction configuration attributes, which can be used by the decoder to configure the way the decoder constructs a prediction of the block samples, whether triangular partitioning is to be employed, and, if so, whether inter-prediction, intra-prediction, or a combination thereof are to be used. The attributes may for instance also specify how the combination should be implemented, such as including weight parameters, or an index to another table of pre-determined weight parameters.

According to the set of attributes extracted from the look-up table corresponding to the index, the following is determined:

A specific way of partitioning the block into two triangular partitions (i.e. the direction of the diagonal over which the block should be split)
  a) A specific way of predicting the first triangular partition, which may comprise one or more of the following:
    i) A specific inter-prediction mode to form an inter-prediction for the samples in the triangular partition;
    ii) A specific intra-prediction mode to form an intra-prediction for the samples in the triangular partition;
    iii) A specific pair of weightings to combine each sample in each of the intra-prediction and inter-prediction to form a combined prediction of a corresponding sample in the triangular partition;
  b) A specific way of predicting the second triangular partition, which may comprise one or more of the following:
    i) A specific inter-prediction mode to form an inter-prediction for the samples in the triangular partition
    ii) A specific intra-prediction mode to form an intra-prediction for the samples in the triangular partition
    iii) A specific pair of weightings to combine each sample in each of the intra-prediction and inter-prediction to form a combined prediction of a corresponding sample in the triangular partition In step S212, a prediction is generated using the specific characteristics determined in step S210.

In the alternative, if triangular prediction has not been signalled, using the previously described flag, then conventional techniques are used, in step S220, to generate a prediction of the merge-predicted block.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A decoder for decoding a block on a bitstream, the decoder being operable to extract triangular prediction configuration information from the bitstream, on the basis of which the decoder is operable to generate a prediction comprising two parts corresponding to a triangular partition of the block, at least one of the parts being predicted using information obtained by intra-prediction, the triangular prediction configuration information comprising an index to one of a plurality of sets of prediction configuration attributes, each set of prediction configuration attributes being capable of being used to configure the decoder to generate a prediction in accordance with a particular triangular partition-based prediction mode, a first set of prediction configuration attributes of the plurality of sets of prediction configuration attributes being capable of being used to configure the decoder to generate a prediction in accordance with a first triangular partition-based intra-prediction mode, a second set of prediction configuration attributes of the plurality of sets of prediction configuration attributes being capable of being used to configure the decoder to generate a prediction in accordance with a second, different, triangular partition-based intra-prediction mode.

2. A decoder in accordance with claim 1, wherein the decoder is operable to generate said prediction in which at least one of the parts is predicted using merge prediction.

3. A decoder in accordance with claim 1, wherein the decoder is operable to generate said prediction in which at least one of the parts is predicted on the basis of a combination of inter-prediction and intra-prediction.

4. A decoder in accordance with claim 1, wherein each set of prediction configuration attributes comprises a split attribute indicative of the direction in which samples of a block are triangularly partitioned into first and second triangular partitions.

5. A decoder in accordance with claim 4, wherein each set of prediction configuration attributes comprises at least one of:
  an inter-prediction mode indicator on the basis of which the decoder is to form an inter-prediction for the samples in the second triangular partition;
  an intra-prediction mode indicator on the basis of which the decoder is to form an intra-prediction for the samples in the second triangular partition; and
  weightings on the basis of which the samples in each of the intra-prediction and inter-prediction are to be combined to form a combined prediction of a corresponding sample in the second triangular partition.

6. A decoder in accordance with claim 1, wherein the prediction configuration attributes are at least in part computed on the basis of a list of merge candidates used for inter-prediction.

7. A decoder in accordance with claim 1, wherein the prediction configuration attributes are at least in part computed on the basis of a list of most probable modes used for intra-prediction.

8. A decoder in accordance with claim 1, wherein the decoder is operable to extract, from the bitstream, information comprising a flag for each triangular prediction partition, each flag determining whether the triangular partition should be predicted by means of intra-prediction in accordance with a particular triangular partition-based prediction mode.

9. A method of decoding a block on a bitstream, comprising extracting triangular prediction configuration information from the bitstream, and generating a prediction comprising two parts corresponding to a triangular partition of the block, at least one of the parts being predicted using information obtained by intra-prediction, the triangular prediction configuration information comprising an index to one of a plurality of sets of prediction configuration attributes, each set of prediction configuration attributes being capable of being used to generate a prediction in accordance with a particular triangular partition-based prediction mode, a first set of prediction configuration attributes of the plurality of sets of prediction configuration attributes being capable of being used to generate a prediction in accordance with a first triangular partition-based intra-prediction mode, a second set of prediction configuration attributes of the plurality of sets of prediction configuration attributes being capable of being used to generate a prediction in accordance with a second, different, triangular partition-based intra-prediction mode.

10. An encoder operable to encode a block for dispatch on a bitstream, the encoder being operable to generate a prediction comprising two parts corresponding to a triangular partition of the block, at least one of the parts being predicted using information obtained by intra-prediction, the encoder being operable to place on the bitstream triangular prediction configuration information for use by a decoder in producing a corresponding prediction of the block, the triangular prediction configuration information comprising an index to one of a plurality of sets of prediction configuration attributes, each set of prediction configuration attributes being capable of being used to configure the decoder to generate a prediction in accordance with a particular triangular partition-based prediction mode, a first set of prediction configuration attributes of the plurality of sets of prediction configuration attributes being capable of being used to configure the decoder to generate a prediction in accordance with a first triangular partition-based intra-prediction mode, a second set of prediction configuration attributes of the plurality of sets of prediction configuration attributes being capable of being used to configure the decoder to generate a prediction in accordance with a second, different, triangular partition-based intra-prediction mode.

11. A method of encoding a block for dispatch on a bitstream, comprising generating a prediction comprising two parts corresponding to a triangular partition of the block, at least one of the parts being predicted using information obtained by intra-prediction, and placing on the bitstream triangular prediction configuration information for used by a decoder in producing a corresponding prediction of the block, the triangular prediction configuration information comprising an index to one of a plurality of sets of prediction configuration attributes, each set of prediction configuration attributes being capable of being used to configure the decoder to generate a prediction in accordance with a particular triangular partition-based prediction mode, a first set of prediction configuration attributes of the plurality of sets of prediction configuration attributes being capable of being used to configure the decoder to generate a prediction in accordance with a first triangular partition-based intra-prediction mode, a second set of prediction configuration attributes of the plurality of sets of prediction configuration attributes being capable of being used to configure the decoder to generate a prediction in accordance with a second, different, triangular partition-based intra-prediction mode.

12. A signal bearing information defining an encoded block, the information comprising triangular prediction configuration information suitable for use by a decoder in accordance with claim 1.

13. A non-transitory storage medium storing information defining an encoded block, the information comprising triangular prediction configuration information suitable for use by a decoder in accordance with claim 1.

* * * * *